(12) United States Patent
Kawai et al.

(10) Patent No.: US 9,562,575 B2
(45) Date of Patent: Feb. 7, 2017

(54) RATCHET TYPE ONE-WAY CLUTCH

(71) Applicant: NSK-WARNER K.K., Shinagawa-ku, Tokyo (JP)

(72) Inventors: Tsutomu Kawai, Fukuroi (JP); Kazuyuki Fujita, Fukkuroi (JP); Masahiro Yamada, Fukuroi (JP); Sousuke Kawai, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 14/673,909

(22) Filed: Mar. 31, 2015

(65) Prior Publication Data

US 2015/0285319 A1 Oct. 8, 2015

(30) Foreign Application Priority Data

Apr. 3, 2014 (JP) ................................. 2014-076728

(51) Int. Cl.
*F16D 41/12* (2006.01)
*F16D 41/30* (2006.01)
*F16D 41/06* (2006.01)

(52) U.S. Cl.
CPC .............. *F16D 41/12* (2013.01); *F16D 41/30* (2013.01); *F16D 2041/0605* (2013.01)

(58) Field of Classification Search
CPC ........... F16D 41/12; F16D 41/14; F16D 41/30
See application file for complete search history.

(56) References Cited

U.S. PATENT DOCUMENTS

| 2003/0146063 A1* | 8/2003 | Yamada | F16D 41/12 192/46 |
| 2003/0168301 A1* | 9/2003 | Kinoshita | F16D 41/18 192/46 |
| 2004/0016616 A1* | 1/2004 | Stefina | F16D 41/12 192/46 |
| 2004/0112703 A1* | 6/2004 | Kremer | F16D 41/12 192/46 |
| 2008/0236977 A1* | 10/2008 | Akiyoshi | F16D 41/067 192/45.019 |

FOREIGN PATENT DOCUMENTS

JP 2001-208104 A 8/2001

* cited by examiner

*Primary Examiner* — Ramya Burgess
*Assistant Examiner* — Lillian Nguyen
(74) *Attorney, Agent, or Firm* — Shapiro, Gabor and Rosenberger, PLLC

(57) ABSTRACT

A ratchet type one-way clutch is provided that includes an outer race having a pocket on an inner circumference thereof, an inner race arranged on an inner diameter side of the outer race so as to be coaxial therewith, the inner race having a notch on an outer circumference thereof, a pawl member housed in the pocket and engaged with the notch of the inner race to transmit torque between the inner race and the outer race, and a spring for urging the pawl member to the inner race. The ratchet type one-way clutch is provided with urging force stabilizing means for stabilizing an urging force of the spring.

4 Claims, 5 Drawing Sheets

RATCHET TYPE ONE-WAY CLUTCH

BACKGROUND OF THE INVENTION

Field of the Invention

The present invention relates to a ratchet type one-way clutch that uses a ratchet (pawl member) for a lock mechanism. The ratchet type one-way clutch is used for a power transmission section, etc. in automobiles, agricultural machinery, construction machinery, machine tool and so on and has a function such as back stop.

Description of the Related Art

A one-way clutch used in an automatic transmission generally is provided with an outer race and an inner race that rotate relatively to each other and configured to transmit the rotational torque only in one direction by allowing sprags, rollers and others, which transmit the torque between the outer race and the inner race, to engage with a cam surface provided on a track surface of the outer race or the inner race. At the same time, the one-way clutch is configured to run idle in an opposite direction.

Among such one-way clutches, there is a ratchet type one-way clutch that uses a ratchet as a torque transmission member which transmits torque between the outer race and the inner race (see Japanese Patent Application Laid-Open No. 2001-208104). The ratchet type one-way clutch includes: an outer race having a pocket on an inner circumference thereof; an inner race arranged coaxially with the outer race and having a notch on an outer circumference thereof; a pawl member housed in the pocket and engaged with the notch of the inner race so as to lock the one-way clutch, thereby allowing torque to be transmitted between the inner race and the outer race; and a spring for urging the pawl member to the inner race.

When the ratchet type one-way clutch thus configured rotates in one direction, the pawl member slides freely from the outer circumference of the inner race, which results in that the outer race and the inner race run idle relatively to each other. Then, in an attempt of the one-way clutch to rotate in the other direction, the pawl member engages with the notch to lock the one-way clutch. This enables the torque to be transmitted between the inner race and the outer race.

SUMMARY OF THE INVENTION

For a stable operation of the ratchet type one-way clutch, it is necessary to stabilize the actuation and attitude of the spring that urges the pawl member. When the pawl member is engaged and then flicked, the spring may possibly move to a bending direction and be deformed by being sandwiched between the outer race and the pawl member. This destabilizes the attitude of the spring and thus may make it impossible to apply a stable urging force to the pawl member.

Furthermore, the unstable behavior of the spring during the actuation thereof may preclude the urging force set by the spring from being applied to the pawl member.

Generally, the spring that urges the pawl member stably abuts a predetermined region of the pawl member from a fixed direction and applies a predetermined urging force thereto. Destabilizing the behavior of the spring as described above results in not being able to impart the urging force to a right location on the pawl member. As a result, the engagement performance decreases, and so does the durability of the ratchet type one-way clutch.

Therefore, it is an object of the present invention to stabilize the urging force of the spring and improve the engagement performance of the ratchet type one-way clutch, thereby increasing the durability of the ratchet type one-way clutch.

In order to achieve the object described above, the ratchet type one-way clutch of the present invention includes: an outer race having a pocket on an inner circumference thereof; an inner race arranged on an inner diameter side of the outer race so as to be coaxial therewith, the inner race having a notch on an outer circumference thereof; a pawl member housed in the pocket and engaged with the notch of the inner race to transmit torque between the inner race and the outer race; and a spring for urging the pawl member to the inner race, wherein urging force stabilizing means for stabilizing an urging force of the spring is provided.

Furthermore, in order to achieve the object described above, the ratchet type one-way clutch of the present invention includes: an outer race having a pocket on an inner circumference thereof; an inner race arranged on an inner diameter side of the outer race so as to be coaxial therewith, the inner race having a notch on an outer circumference thereof; a pawl member housed in the pocket and engaged with the notch of the inner race to transmit torque between the inner race and the outer race; and a spring for urging the pawl member to the inner race, wherein a space surrounded by an edge portion of the spring for urging the pawl member, the outer race and the pawl member is formed, the space having a radial width that is capable of housing an end turn of the edge portion of the spring, and a guide member is arranged at an axial end of the spring on a bottom part side of the pocket.

The present invention provides following advantageous effects:

The stabilized attitude of the spring makes it possible to impart a stable urging force to the pawl member. This allows the engagement performance of the ratchet type one-way clutch to be improved, thereby increasing the durability of the ratchet type one-way clutch.

Further features of the present invention will become apparent from the following description of exemplary embodiments with reference to the attached drawings.

DESCRIPTION OF THE EMBODIMENTS

Figure 1:
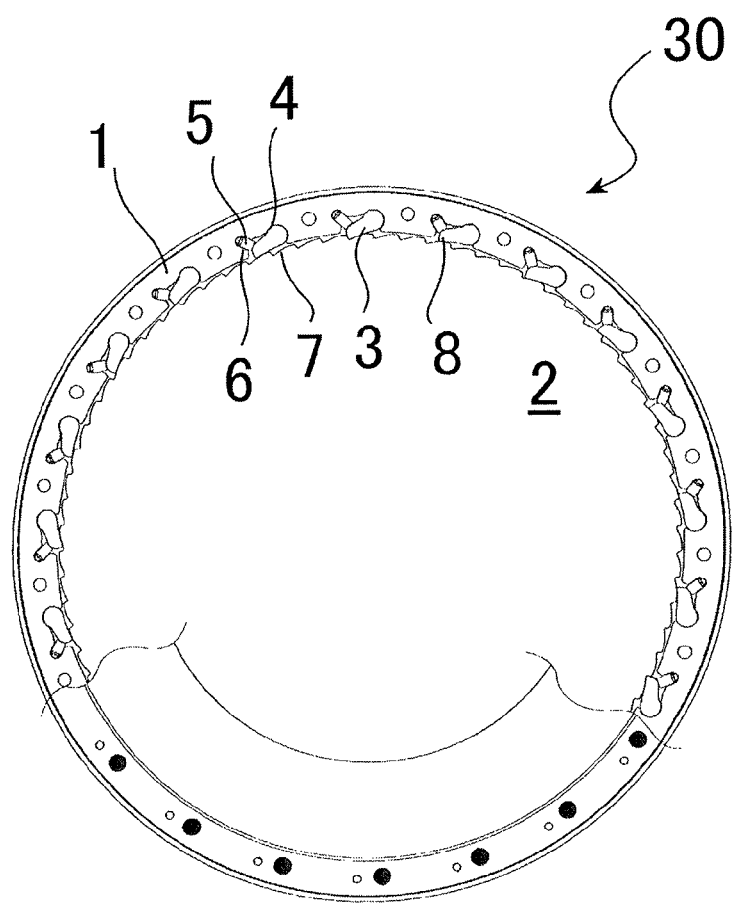
FIG. 1 is a front view of a ratchet type one-way clutch to which embodiments of the present invention are applied.

Preferred embodiments of the present invention will now be described in detail in accordance with the accompanying drawings. Note that like reference characters denote corresponding parts throughout the drawings.

FIG. 1 is a front view of a ratchet type one-way clutch to which embodiments of the present invention are applied.

The ratchet type one-way clutch 30 includes an outer race 1 having pockets 4 on an inner circumference thereof and an inner race 2 arranged on an inner diameter side of the outer race 1 so as to be coaxial with the outer race 1. The inner race 2 has notches 7 on an outer circumference thereof. In each of the pockets 4 opening toward the inner race 2, a pawl member 3, which engages with each of the notches 7 and transmits torque between the outer race 1 and the inner race 2, is rockably housed.

In a spring pocket 6 that opens toward each of the pockets 4 in a vicinity of a tip portion 8 of the pawl member 3 and extends radially outward, a spring 5 that urges the pawl member 3 to the inner race 2 is housed. The spring 5, which is a coil spring, abuts the tip portion 8 of the pawl member 3 with an axial end thereof and urges the pawl member 3 toward the inner diameter side.

A plurality of pawl members 3, pockets 4 and spring pockets 6 are provided circumferentially equally divided. The numbers thereof are optional and may be increased or decreased as appropriate in consideration of torque and so on. Note, however, that it is preferable to arrange them circumferentially at equal intervals.

Meanwhile, the inner race 2 engages with a shaft (not shown) that is fixed by splines (not shown) provided on an inner circumferential side. Each of the notches 7 extends axially, and an axial length thereof corresponds to an axial width of the pawl member 3. It is needless to say that the number of the notches 7 can optionally be set depending on, e.g., the number of the pawl members 3.

In the ratchet type one-way clutch 30 configured as above, the outer race 1 performs a function of being able to rotate to the right in FIG. 1 relatively to the inner race 2 but not being able to rotate to the left due to the engagement between the pawl member 3 and the notch 7. That is, while the ratchet type one-way clutch 30 can run idle to the right, it is locked against rotation to the left, thereby allowing torque to be transmitted between the inner race and the outer race. In the locked state, an engaging tip 8a of the tip portion 8 of the pawl member 3 (see FIGS. 2 and 4) engages with an engaging recess 9 of the notch 7 (see FIGS. 2 and 4).

In accordance with the ratchet type one-way clutch 30 as described above, embodiments of the present invention are now described.

First Embodiment

Figure 2:
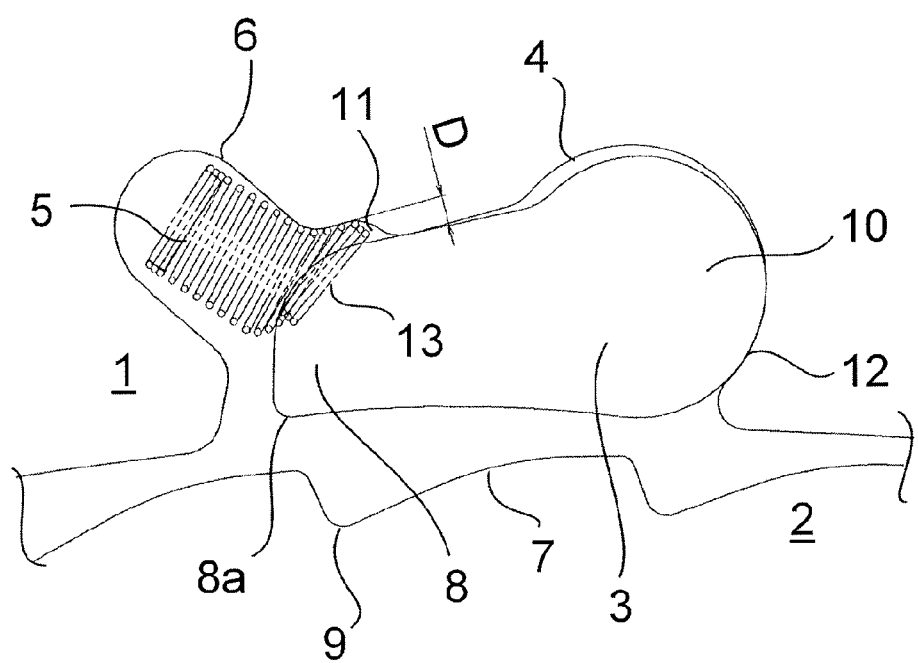
FIG. 2 is a schematic diagram of a first embodiment of the present invention showing a relationship among a spring, a pawl member and an outer race as enlargement.
Figure 3:
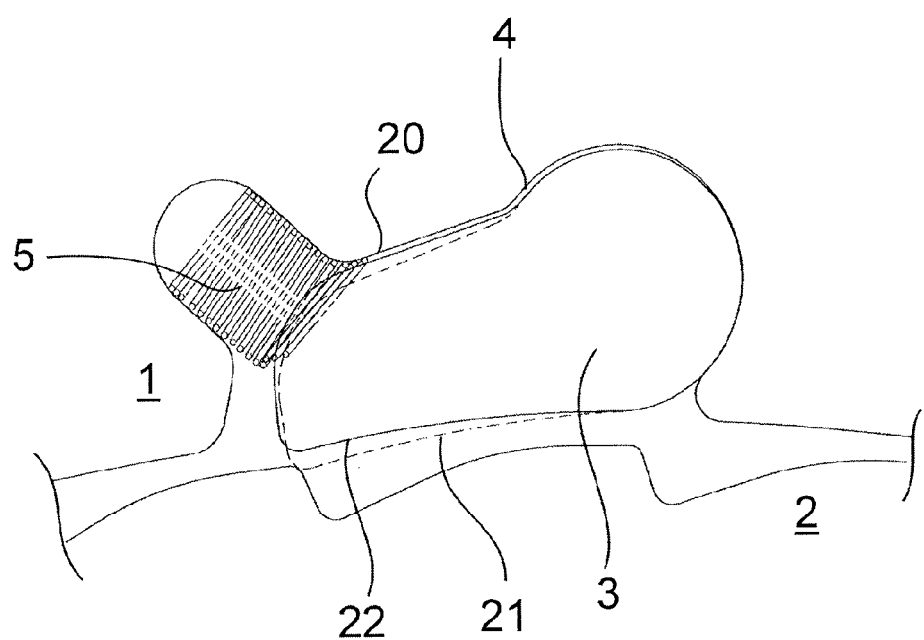
FIG. 3 is a schematic diagram showing a relationship among a spring, a pawl member and an outer race in accordance with the prior art as enlargement.

FIG. 2 is a schematic diagram of the first embodiment of the present invention showing a relationship among the spring, pawl member and outer race as enlargement. FIG. 3 is a schematic diagram showing a relationship among the conventional spring, pawl member and outer race for comparison with the first embodiment shown in FIG. 2.

When the ratchet type one-way clutch 30 is in operation or when it turns from the idle state to a reverse rotation and thus to the locked state, the pawl member 3, which engages with the notch 7, may be flicked and displaced from the position shown by a dashed line 21 to the position shown by a continuous line 22. Here, as illustrated in FIG. 3, the spring 5 abutting the pawl member 3 moves to the bending direction, which may cause the edge portion of the spring 5 to be deformed by being sandwiched at a slight gap 20 between the outer race 1 and the pawl member 3.

As a result of such deformation, the spring 5 has an unstable attitude during operation even if the edge portion thereof is released from the gap 20. It is then likely that the stable urging force can no longer be applied to the pawl member 3.

This problem is solved by the first embodiment shown in FIG. 2. FIG. 2 illustrates a situation where the pawl member 3 is flicked to come off from the notch 7 and the tip portion 8 thereof is located on the outermost diameter side. The pawl member 3 has a circular portion 10 at the end opposite to the tip portion 8. This circular portion 10 rotates within a circular recess 12 in the pocket 4, thereby allowing the pawl member 3 to rock about the circular portion 10.

As is clear from FIG. 2, a space 11 is formed that is surrounded by the edge portion of an axial end 13 of the spring 5 urging the pawl member 3, the outer race 1 and the pawl member 3. This space 11 formed by the surrounding edge portion of the spring 5 urging the pawl member 3, outer race 1 and pawl member 3 serves as urging force stabilizing means that stabilizes the urging force of the spring 5. The space 11 is defined in the outside diameter wall of the pocket 4 as an axially extending groove that is adjacent to the opening of the spring pocket 6. When the pawl member 3 is flicked to come off from the notch 7 and the tip portion 8 moves to the outermost diameter side, the spring 5 is displaced by being pushed by the tip portion 8 so that the edge of the axial end 13 of the spring 5 is housed in the space 11 with an enough margin. The space 11 functions as a clearance that prevents the spring 5 from being deformed. The space 11 has a size that is capable of housing an end turn portion of the axial end 13 of the spring 5 that abuts the pawl member 3 with an enough margin. When the pawl member 3 returns to the position where it is engaged with the notch 7, the edge of the spring 5 is released from the space 11 and recovers to the original shape to give a stable urging force.

The space 11 has a radial width (depth) that is capable of housing the end turn of the edge portion of the spring 5 with an enough margin. If the radial width of the space is defined as D, the number of the end turns of the spring 5 that can be housed is defined as N, and the wire diameter of the spring 5 is defined as S, the width D is set to satisfy the following relation:

$$D > N \times S$$

It will be necessary to make design changes of the pawl member 3, spring 5 and others depending on the magnitude of the toque to be transmitted between the outer race 1 and the inner race 2. However, the deformation of the spring 5 can be prevented by setting the radial width D of the space, the number of the end turns of the spring 5 that can be housed N and the wire diameter S of the spring 5 in such a manner that they satisfy the above relational expression. This stabilizes the urging force of the spring 5 that urges the pawl member 3.

Second Embodiment

Figure 4:
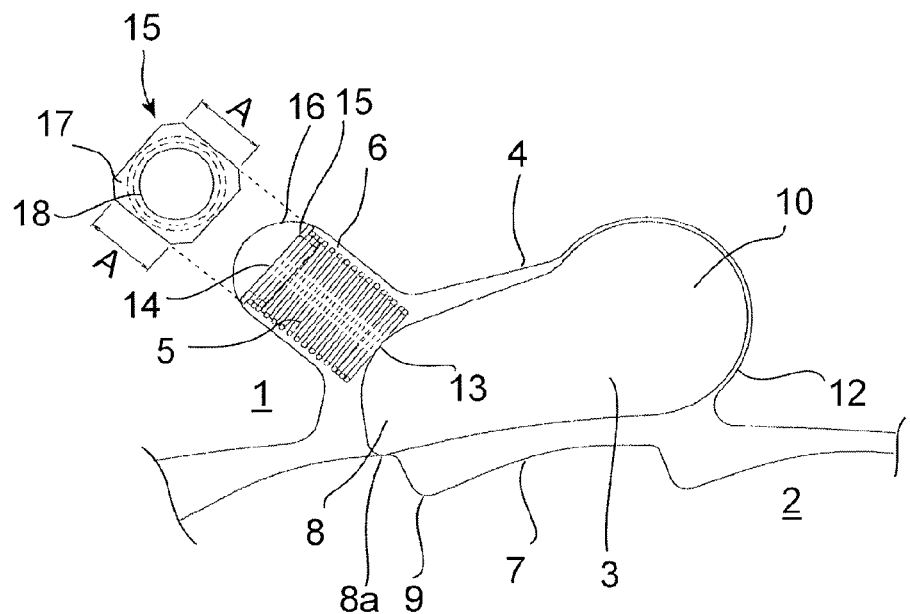
FIG. 4 is a schematic diagram of a second embodiment of the present invention showing a relationship between a spring and a pocket as enlargement.

FIG. 4 is a schematic diagram of the second embodiment of the present invention showing a relationship among the spring, pawl member and outer race as an enlargement.

In the second embodiment, the means for stabilizing the urging force of the spring is a guide member 15 provided at an axial end of the spring 5. The guide member 15 is arranged at an axial end 14 of the spring 5 on a bottom part 16 side of the spring pocket 6 in which the spring 5 is housed.

The guide member 15 includes a rectangular or polygonal plate 17 having a slightly larger size than the outer diameter of the spring 5 and a cylindrical portion 18, and is fixed to the spring 5 by inserting cylindrical portion 18 into the inner diameter of the spring 5. The spring 5 is guided by the guide member 15 along the inner wall of the spring pocket 6.

A conventional spring, with which no guide member is provided, is supported at two points on a circumference of the spring 5 that are opposed by 180 degrees. In this embodiment, however, at least two opposing sides A of the rectangular guide member 15 contacts the inner wall of the spring pocket 6 so that the guide member is supported by at least two planes or lines, thereby allowing the spring 5 to be stably guided. In this manner, the urging force of the spring 5 that urges the pawl member 3 is stabilized.

The guide member 15 may have a shape other than a rectangle as long as it contacts the wall of the spring pocket 6 with at least two planes or lines.

According to the second embodiment, the guide member 15 stabilizes the attitude of the spring 5. This allows a stable urging force to be applied to the pawl member 3. As a result, the reliability of the engagement of the ratchet type one-way clutch 30 increases, thereby attaining the stabilization of the rotation number of the ratchet type one-way clutch 30 in light-off of the pawl member 3.

Third Embodiment

Figure 5:
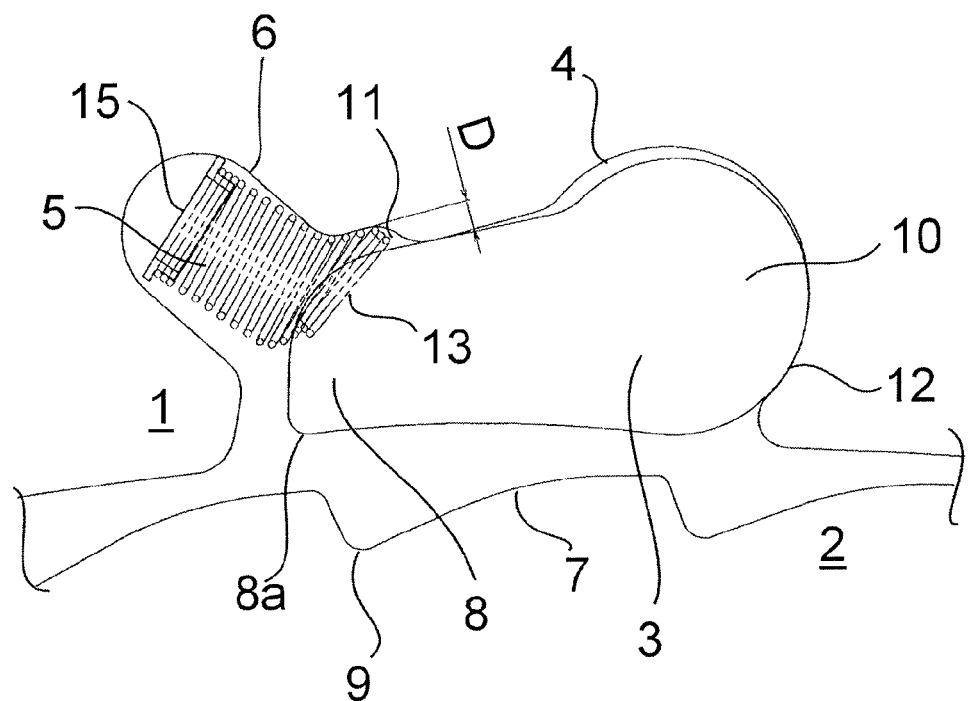
FIG. 5 is a schematic diagram of a third embodiment of the present invention showing a relationship between a spring and a pocket as enlargement.

FIG. 5 is a schematic diagram of the third embodiment of the present invention showing a relationship among the spring, pawl member and outer race as enlargement. The third embodiment is a combination of the first and second embodiments. As the guide member 15 of this embodiment, the one that is same as the guide member 15 described with reference to FIG. 4 may be used.

When the ratchet type one-way clutch 30 is in operation, the spring 5 applies a stable urging force to the pawl member 3 while maintaining a stable attitude due to the guide member 15 as shown in FIG. 4. However, when the pawl member 3 is engaged with the notch 7 and then flicked, the space 11 makes it possible for the end turn of the spring 5 to escape into the space 11 as shown in FIG. 5. This allows the spring 5 to be prevented from deformation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076728, filed Apr. 3, 2014, which is hereby incorporated by reference herein in its entirety.

What is claimed is:

1. A ratchet type one-way clutch comprising:
an outer race having a pawl member pocket on an inner circumference thereof;
an inner race arranged on an inner diameter side of the outer race so as to be coaxial therewith, the inner race having a notch on an outer circumference thereof;
a pawl member housed in the pawl member pocket and adapted to move between innermost and outermost positions, the pawl member in the innermost position being engaged with the notch of the inner race to transmit torque between the inner race and the outer race; and
a coil spring engaging a tip portion of the pawl member to urge the pawl member to the innermost position,
wherein the coil spring is contained in a spring pocket which, at one end thereof, opens to the pawl member pocket, and the clutch is constructed so that, with the pawl member at its outermost position, a space is defined between an outer surface of the pawl member and an outer wall of the pawl member pocket adjacent to the open end of the spring pocket, the space being adapted, by its size, shape, and location, to house an end turn portion of the coil spring.

2. The ratchet type one-way clutch according to claim 1, wherein a guide member is provided at an axial end of the spring on a bottom part side of the spring pocket.

3. The ratchet type one-way clutch according to claim 2, wherein the guide member is polygonal and contacts a wall of the spring pocket with at least two planes or lines.

4. The ratchet type one-way clutch according to claim 1, wherein the space is defined as an axially extending groove.

* * * * *